United States Patent [19]

Paranjpe

[11] Patent Number: 5,045,094
[45] Date of Patent: Sep. 3, 1991

[54] NONWOVEN FIBER BED MIST ELIMINATOR

[75] Inventor: Prabhakar D. Paranjpe, St. Louis, Mo.

[73] Assignee: Monsanto Company, St. Louis, Mo.

[21] Appl. No.: 468,089

[22] Filed: Jan. 22, 1990

Related U.S. Application Data

[63] Continuation-in-part of Ser. No. 284,932, Dec. 15, 1988, abandoned.

[51] Int. Cl.$^5$ .............................................. B01D 46/00
[52] U.S. Cl. ........................................ 55/97; 55/487; 55/524; 55/528; 55/498
[58] Field of Search ............................ 55/97, 185–188, 55/524, 528, 259, 486, 487, 498; 210/508

[56] References Cited

U.S. PATENT DOCUMENTS

| | | | |
|---|---|---|---|
| 3,871,850 | 3/1975 | Lenane | 55/486 |
| 4,050,237 | 9/1977 | Pall et al. | 60/39.08 |
| 4,086,070 | 4/1978 | Argo et al. | 55/97 |
| 4,159,360 | 6/1979 | Kim | 428/195 |
| 4,211,661 | 7/1980 | Perry | 210/491 |
| 4,251,238 | 2/1981 | Claes et al. | 55/97 |
| 4,360,433 | 11/1982 | Walker et al. | 210/484 |
| 4,478,620 | 10/1984 | Tamura | 55/486 |
| 4,702,940 | 10/1987 | Nakayama et al. | 427/244 |
| 4,726,901 | 2/1988 | Pall et al. | 210/496 |

OTHER PUBLICATIONS

"DuPont Dacron for Thermal Bonding: DuPont Fibers for Nonwovens".
Gibson, P. E., and McGill, R. L. "Thermally Bondable Polyester Fiber: The Effect of Calender Temperature", Research Laboratories, Eastman Chemicals Div., Eastman Kodak Co., Kingsport, Tennessee 37662. Tappi Journal (Dec. 1987), pp. 82–86.

Primary Examiner—Bernard Nozick
Attorney, Agent, or Firm—Senniger, Powers, Leavitt & Roedel

[57] ABSTRACT

Nonwoven fiber bed mist eliminators in which at least one filter element is comprised of a fiber bed of syntheic polymer nonwoven material or fabric containing coalescing or collection sites wherein the ratio of the wet bed pressure drop to the dry bed pressure drop is essentially constant.

37 Claims, 5 Drawing Sheets

TYPICAL HEAT SET PATTERN OF A
NON-WOVEN POLYMER FABRIC USING
A THERMO-BONDING CALENDER PROCESS

FIG. 1 TYPICAL HEAT SET PATTERN OF A NON-WOVEN POLYMER FABRIC USING A THERMO-BONDING CALENDER PROCESS

FIG.2 THEORETICAL VARIATION OF MIST CONCENTRATION ACROSS THE FIBER FILTER

FIG.3 VARIATION IN LIQUID FLOW RATE ACROSS THE FIBER FILTER, AT ELEVATION Z; AND FLOW MEASURED IN THE DIRECTION OF GRAVITY

FIG. 6 FRACTIONAL EFFICIENCY COMPARISON, 25 FPM (ACTUAL)

△ - THERMO-BONDED
X - BULK PACKED

FIG. 7

NONWOVEN FIBER BED MIST ELIMINATOR

This application is a continuation-in-part of Ser. No. 284,932 filed Dec. 15, 1988.

This invention relates to mist eliminators or separators in which at least one filter element is comprised of a fiber bed of synthetic polymer nonwoven material or fabric containing coalescing or collection sites wherein the ratio of the wet bed pressure drop to the dry bed pressure drop is essentially constant.

BACKGROUND OF THE INVENTION

Fiber bed mist eliminators or separators have found widespread use in applications where very fine aerosols of under 3 microns in particle size must be separated from a gas or vapor stream (collectively referred to herein as a gas stream). The fiber beds of such separators have utilized fibers of varied diameter, ranging from as small as 5 microns or less to more than 200 hundred microns, as well as combinations thereof. The efficiency of such fiber bed separators is high, and efficiencies of 99% or higher are not uncommon. Some of the more frequent applications for fiber bed mist eliminators include removal of acid mists, such as sulfuric acid mist, in acid manufacturing, removal of plasticizer mists in the manufacture of poylvinyl chloride floor or wall coverings, and removal of water soluble solid aerosols such as emissions from ammonium nitrate prill towers.

For many applications, as where corrosive conditions and/or high temperatures are encountered, chemical grade glass fibers have been the materials of choice for fiber beds. On the other hand there are applications where the use of these fibers may not provide the desired corrosion resistance. For example, there are many industrial applications that have aqueous mist emissions which are weakly acidic or weakly alkaline. In those applications the materials of choice are synthetic polymer fibers, such as polyester fibers. The synthetic polymer fibers also have the desirable property of being softer and therefore easier to handle during the manufacture of fiber beds and in many cases the corrosion resistance is superior to glass fibers.

One problem associated with any fiber bed is that of maintaining a mechanically stable bed, that is, a bed which will retain its structural integrity without substantial shifting of fibers in the bed during aerosol collection under design operating conditions. If mechanical stability is not maintained the performance characteristics of the bed will be altered. For example, in an unstable bed the fibers can mat in localized areas of the bed making those areas more resistant to the flow of liquid or gas. However, the art has developed various ways for providing relatively stable fiber beds, such as the selection of fiber diameter, bed thickness and packing density combinations, and the use of reinforcing materials without also inducing flooding conditions within the bed. In the case of prior art fiber beds made from synthetic polymer fibers (bulk packed beds), one solution has been to maintain a high enough packing density to initially provide mechanical bed stability, followed by an appropriate heat treatment of the bed, referred to as annealing, to relieve mechanical stresses in the fiber and thereby provide a polymer fiber bed which will remain stable under operating conditions. In the annealing of synthetic polymer fiber beds the annealing temperature depends upon the chemistry and physical properties of the polymer fiber used. If, as preferred, annealing is done after the fiber is packed in the filter cage, the construction material of the filter cage must be able to withstand the annealing temperature. Typically, however, the cage is of a different material of construction than the fiber bed and is selected on the basis of corrosion considerations and cost. As a result, it often occurs that the maximum working temperature of the cage is less than the desired annealing temperature, eliminating the opportunity to utilize a desired design. As an example, polypropylene has many properties which make it a desireable material for the construction of cages and polyester fibers are the material of choice for some bulk pack fiber bed elements. However, a temperature of about 30° F. is required for annealing polyester but the maximum working temperature of polypropylene is about 175° F., making this combination of materials unavailable.

Other problems associated with the use of synthetic polymer fibers are that fiber lengths are limited to a maximum of about 3 inches (7.62 cm) since longer staple lengths cannot be processed in the currently available carding machines, the fibers are soft and pliable, and the finer the fiber diameter the softer the final Product. Therefore, in order to make a stable high efficiency fiber bed, relatively high packing densities are required. For polyester bulk fiber beds a bed density of greater than 8 lbs/ft$^3$ (128 kg/m$^3$) is typically used. As a result the bulk packing operation is difficult and expensive and also limits the choice of a material of construction for the filter cage.

SUMMARY OF THE INVENTION

It is therefore an object of this invention to provide a novel synthetic polymer fiber bed mist eliminator element for treatment of aerosol containing gases without any substantial reentrainment, even at high bed velocities, which is mechanically stable under operating conditions but which does not require annealing or post forming heat treatment of the bed in order to retain the long term mechanical stability of the bed.

Another object is to provide a novel synthetic polymer fiber bed element that does not require an expensive, specialized, bulk packing technique to achieve the desired mechanical stability of the fiber bed.

A further object of the invention is to provide a fiber bed element comprised of a synthetic polymer fiber bed which can be used in combination with different materials, whether in the bed or cage or elsewhere, for example a different synthetic polymer fiber, to provide for various design combinations wherein such combinations are not limited by the need for annealing of the fiber bed after it is manufactured.

An additional significant feature of the invention is the provision of a synthetic polymer fiber bed element wherein the ratio of the wet bed pressure drop to the dry bed pressure drop is substantially reduced as compared to a conventional bulk packed fiber bed, and for practical purposes essentially constant and is essentially independent of bed thickness. A further object is, therefore, to provide a fiber bed element wherein the selection of bed thickness can be based essentially upon exit emission requirements and the resulting wet bed pressure drop can be readily determined without the need for complex calculations.

An additional object of this invention is to provide a method for removal of sub-micron and larger size aerosols or particles with a high collection efficiency. It is also an object to provide a method for removal of such aerosols or particles from high volumes of gasses at high bed velocities.

These and other objects are achieved by introducing into the fiber bed of a synthetic polymer fiber bed mist eliminator element, comprised of synthetic polymer nonwoven fabric, liquid coalescing or collecting sites or points (of finite size). Conveniently, such sites are provided by preparing a mist eliminator element comprised of a point bonded synthetic polymer nonwoven fabric or material.

The invention is also directed to a preferred method for producing such an element wherein a point bonded synthetic polymer nonwoven fabric is first gathered to form a simulated roving and then wound to the desired thickness, density and void fraction.

As used herein a fiber bed mist eliminator element is a structure in which the separation of liquid from gas occurs. A fiber bed separator includes the element and the vessel and appurtenant hardware comprising an operative piece of equipment.

DETAILED DESCRIPTION OF THE INVENTION

The coalescing or collecting sites in the synthetic polymer nonwoven fiber bed of an element of the invention are sites where the fibers of the nonwoven fabric have been point bonded or joined in a manner whereby the bond or joint creates a liquid coalescing or collecting site which has an equivalent surface area diameter which is at least about 3, preferably about 10 times the diameter of the fiber used to manufacture the nonwoven. Bonding of the fibers can conveniently be accomplished by thermal bonding of the fibers of a nonwoven fabric in a calendering operation employing a heated calender roll. However, other bonding means can be utilized provided that the resulting bonding site has the minimum equivalent surface area diameter relative to the fiber diameter.

The point bonded synthetic polymer nonwoven fabrics useful for the manufacture of fiber bed elements of this invention are prepared by methods known to the art. Typically their manufacture involves the steps of (1) staple fiber blending, using fibers of a single polymer or mixture of fibers made from different polymers, as well as fibers of approximately the same or different length and/or con figuration, (2) carding, (3) fiber randomizing, (4) web formation and (5) bonding. For handling purposes the nonwoven is usually wound onto rolls after bonding is completed. Such fabrics are commercially available. For purposes of this invention a thermo-bonded fabric prepared by calendering is preferred since there is no need to be concerned with the chemical and mechanical stability of the bonds of the fabric under the many different applications for which the instant fiber bed elements are likely to be prescribed. Further, the nature of a calendering operation is such that the cost of the point bonded nonwoven is relatively low and uniformity in fabric properties, such as thickness, density, bonding pattern and tensile strength, are obtained.

Modern installations are capable of producing point bonded nonwoven fabrics having fabric weights ranging from about 0.4 to about 1.75 oz./sq. yd. 15–60 gms./m$^2$) with a fabric width up to about 137 inches (3.4 m). Such fabrics are useful in the practice of the invention. Preferably the nonwoven fabric should have a weight per unit of area of about 1 oz./sq.yd. 35 gms./m$^2$) or less. A typical point bonded nonwoven polyester fabric has a weight of about 0.7 oz./sq. yd. (23.7 gms/m$^2$). Heavier weight fabrics are not as desireable since, in the calendering operation difficulty in bonding may be experienced, resulting in a nonuniform bonding pattern. The effect of a nonuniform bonding pattern is to introduce a tendency of a fiber bed element made with such a fabric to be less efficient in the separation of aerosols as a result of fiber matting, liquid holdup and resulting reentrainment.

Examples of suitable point bonded fabrics for use in producing the mist eliminator elements of this invention include those made from webs formed from synthetic fibers such as polyester fibers, polyamide fibers, polyacrylonitrile fibers, polyvinyl alcohol fibers, polypropylene fibers, polyimide fibers and reclaimed fibers such as rayon fibers. It is also contemplated that nonsynthetic fibers, for example metal, ceramic or glass fibers, can be blended with a synthetic polymer fiber to provide a nonwoven fabric useful in preparing the bonded nonwoven fabrics used herein. In that case the coalescing points can still be introduced into the synthetic polymer, for example by calendering, as described herein.

In designing elements according to this invention, the bonded fabric can be made from a fiber of any diameter, for example, a fiber having a mean diameter of about 1 to 300 microns although fibers of a diameter of 5 to 200 microns are more often used, a mean diameter of up to about 50 microns being a typical maximum in use today. In general a fiber diameter of about 5 to 50 micrometers is preferred. More preferable diameters are from about 10 to about 35 micrometers. For example, polyester fiber diameters ranging from about 10 to about 25 micrometers, corresponding to about 1.35 to about 6 denier, have been found to be quite useful. While fiber lengths do not appear to greatly influence the operation of the elements of this invention, present day commercially produced nonwovens have fiber lengths in the range of ½ to 4 inches (about 1 to about 10 cm), the latter being limited by the carding operation. Best results are obtained with fibers with a length of about 1.5 to about 3 inches (about 4 to about 8 cm.). Blends of fibers of different fiber diameters and/or lengths can also be used. Also, the fibers used to make the nonwoven may be crimped or of a cross section other than round, e.g., oval or trilobal. More importantly, however, the maximum diameter of the coalescing sites should be below about 1500 microns, preferably below about 1000 microns, and more preferably about 400-600 microns.

A typical nonwoven fabric useful in the invention is one produced by blending fibers of a selected polymer or polymers of different denier and length. Any blend combination is useful, a particular blend being determined by application of the principles of this invention and experimentation as is presently practiced by those skilled in the art. As a result of using a blend of fibers to produce the point bonded nonwoven fabrics, elements made from such fabrics have reduced pressure drop and improved drainage. A nonwoven fabric made from polyester fiber using a blend of fibers of different denier and different length is preferred. Such blends will typically have tenacity ratios in the range of about 3–12. For example, a blend of polyester fibers having 20 percent of 6 denier (25 microns) by 2 inch (about 5 cm) long fibers and 80 percent of 1.35 denier (10 microns by 1½ inch (4 cm) long fibers has been found to provide a very effective fabric for manufacturing a mist eliminator element having excellent separation capability. This blend is especially useful when utilized to manufacture a lightly point thermal bonded nonwoven fabric. Such a point bonded fabric will typically have a nominal basis weight of about 20 gm per square yard (23.92 gm/m²), and an average tenacity ratio in the range of 3.8–8.0.

The tenacity ratio, an indicator of fabric tensile strength, is determined as follows:
Tenacity Ratio =

$$\frac{T_m}{T_c}$$

where:
$T_m$ = Fabric tensile strength in the machine direction expressed as (cN/tex)
cN = tensile strength in centi-Newtons
tex = mass in grams of 1 Km of fiber
$T_c$ = Fabric tensile strength in the cross machine direction (cN/tex)

Tensile testing can be performed using Instron Model TTB in accordance with ASTM test method D-1117 or any other equivalent technique.

An ideal point bonded nonwoven fabric for use in this invention would have a tenacity ratio of 1. However, due to the nature of the process for manufacturing nonwoven fabrics, that ratio is usually not obtainable. Nevertheless, fabrics having a tenacity ratio up to about 25-30 can be used. Preferably, the point bonded nonwoven fabrics will have tenacity ratios less than about 20, and more preferably less than about 10, that is, it is more preferred to employ a fabric in which the tensile strength in the machine direction is no more than about 10 times the tensile strength in the cross-machine direction.

In the calender thermal bonding process the thermobonding temperature and the calender roller pressure can be adjusted over a wide range to produce a variety of point bonded nonwoven fabrics using any thermosetting polymer staple fiber. The bonding pattern of the calendar can also be varied. The mechanics of the calendering process are such, however, that at a fixed calender roller pressure, there is an optimum setting for the contact time and the calender temperature, primarily as a function of polymer melting point, that will produce the best results in terms of the desired fabric properties. The contact time in turn is dependent upon the production rate; therefore, the calender temperature is the usual control variable for producing the desired fabric properties.

As noted above, the bonding or coalescing sites of the nonwoven fabrics of this invention should have an equivalent surface area diameter of at least about 3 times the diameter of the fiber used in the manufacture of the nonwoven. The equivalent surface area diameter can be expressed, for the purposes of this invention, by the following equation:

$$\text{equivalent surface area diameter} = \sqrt{\frac{A_s}{3.14}}$$

where $A_s$ is the average surface area of a bonding site, and is determined from the following equation:

$$A_s = \left(\frac{d^2}{2} + dt\right) 3.14$$

where
d = the average diameter of the horizontal surface of the coalescing sites, and
t = the average thickness or depth of the coalescing sites.

Various techniques are known to the art which are suitable for determining the diameter, d, and the thickness, t. For example, the average diameter of a bonding site can be determined by measurement of the average diameter of a representative number of sites on an enlarged photograph of the surface of a point bonded nonwoven fabric. A similar technique can be used for determining the thickness of a bonding point by using a photograph of a cross section of a point bonded nonwoven fabric. Alternatively, the maximum thickness of the bonding points can be estimated according to the equation:

thickness = N $d_f$ where
N = the average number of fibers at a bonding point, and
df = fiber diameter, cm.

In turn, N can be determined from the equation:

$$N = \frac{FWT}{Rho_f \times d_f}$$

where
FWT = fabric weight, gms./cm² of fabric
$Rho_f$ = fiber density, gms./cm³, and
$d_f$ = fiber diameter, cm.

The actual average thickness of the bonding points may be less than the maximum thickness estimated from the above equation, depending upon the calender roller pressure and the temperature used in the bonding step. However, the maximum percent error introduced into a determination of the surface area diameter of the bonding sites, as a result of using the calculated thickness as opposed to the thickness determined by measurement, is generally less than 15 percent.

A bulk packed fiber bed does not contain stable or bonded coalescing sites. However, if certain assumptions are made, it is possible to compare a bulk packed fiber bed with the fiber beds of this invention. Thus, if it is assumed that in a bulk packed fiber bed that whenever randomly oriented fibers cross over other randomly oriented fibers coalescing sites result, the equivalent surface area diameter for such "crossover points" can be calculated. For that purpose the average surface area, $A_s$, for a crossover point is equal to the fiber surface area at that point (i.e., the surface area for a crossover point equals the circumference of the fiber times a fiber length equal to the fiber diameter, $d_f$ times the thickness, t, of the crossover point, which, under this assumption, is equal to the number of fiber layers at the crossover point, n). Therefore, the equivalent surface area diameter can be assumed to be:

$$\text{equivalent surface area diameter} = \sqrt{\frac{3.14(d_f)(d_f)(n)}{3.14}}$$

$$\text{or, simply,} = \sqrt{(d_f^2)n}$$

However, as further illustrated herein, such sites are considerably smaller than the stable sites of the fabrics used in the beds of the invention.

Furthermore, the qualities of a fabric can change with different calendering machines because of the differences, for example, in the calender pattern, which will result in different point bonding pattern. To achieve a desired result the number of bonding sites can also be varied and the performance of a mist eliminator made from a variety of bonding patterns is contemplated. However, the depth profile of the bond points, as discussed below, has a greater influence on the performance of a selected point bonded fabric. Since there are a very large number of point bonded fabrics available, made from many different polymers and providing a variety of fabric properties, the selection of a fabric for use in the present invention can be, at least initially, primarily concerned with chemical resistance of the polymer used to make the fabric, fabric weight and fiber denier or diameter as discussed above. In the design of a mist eliminator element of the invention it as been found that so-called "lightly point bonded nonwoven fabric" is preferred. Essentially this means a point bonded fabric in which the thickness of the bonding points, measured perpendicular to the web direction during formation of the fabric, are less than the total thickness of the unbonded fabric. In the case of a fabric prepared using a heated calender, this means the least possible calender temperature and roller pressure that will result in partial melting at the calender points. For a given polymer there is a minimum tackifying temperature which is dependent upon the production rate conditions. Bonding at from 1-100% of the fabric thickness can be used, however, a very short or thin bond can have an adverse effect on the tensile strength of the nonwoven. For polyester fiber fabric a lightly point bonded fabric prepared by the preferred calender operation will have a bond thickness in the range of about 35% to about 95% of the thickness of the fabric in unbonded areas. Selection of the optimum thickness of the bonding point can be determined empirically for a specific polymer fiber, depending on various considerations known to the art, e.g., element application, bonding process, and the like. In any case, room temperature cooling is used before the final product goes to a winding system to provide rolls of fabric.

Additionally, in selecting a fabric for use in the present invention, one approach is to select a fabric having a "flexible and soft" hand or feel as a guideline for insuring that the fabric has the preferred characteristics.

Another quality control index is to select a random fabric sample and gradually pull the fabric in the machine direction. If it is observed that most of the fibers come loose from the bond points without fiber breakage then the fabric has the preferred strength and degree of bonding quality. This test, along with the tenacity ratio, can then be used as a guideline to select a fabric which was manufactured with a suitable calender temperature. In the case of a given fabric, performing these various tests will indicate that the fabric is suitable or that a fabric manufactured under different conditions would be more desireable. For example, if bonding was accomplished in a calender operation, a higher or a lower bonding temperature or a change in roll pressure might be more desireable. With polyester fiber fabric, for example, it has been found that 300 pounds per linear inch (about 5358 kg/m) as the calender roller pressure and 230° C. (446° F.) as the calender surface temperature when the production rate is about 50 meters of fabric per minute provides a point bonded fabric of the desired properties.

In general, point bonded non-woven fabrics have good tensile strength in the longitudinal direction, that is the direction in which they are formed and wound, but relatively poor tensile or mechanical strength in the transverse direction. Because of this property, the use of point bonded non-woven fabrics to manufacture the mist eliminator elements of this invention does not provide the most satisfactory product for some applications.

However, it has been discovered that this deficiency can be overcome in the manufacture of the fiber bed elements of this invention by first gathering the bonded nonwoven fabric, which is relatively quite thin, in a manner whereby the gathered product is in the form of a simulated roving, that is, in appearance it somewhat resembles a roll or strand of textile material, but is preferably one which is flat in order to facilitate winding of the mist eliminator element. As a result of the gathering step the simulated roving has great tensile strength in both directions, more than is normally required to make a very efficient, high density filter element, and is therefore very suitable for the manufacture of wound filter elements. Gathering of the fabric to form the simulated roving can be accomplished by means known to the art. A preferred simulated roving is one where an 80 inch (about 2 meters) wide fabric has been gathered to form a roving of at least about 10 inches (25 cm) wide, but preferably 2-6 inches (5-15 cm) wide providing about 6 to 2 folds per foot of fabric width.

After the gathering step the gathered nonwoven fabric is spirally wound around a suitable foraminous core to form a filter element of the desired thickness using a winding tension which will result in a filter element having the desired void fraction. Preferably, winding of each layer of gathered fabric is carried out at an angle greater than 90° to the center line of the core and in such manner that each layer is at an approximately 90° angle to the angle selected for the preceding underlying layer. Since commercially available winding machines are typically provided with means for varying the winding tension it is also possible to program such machines to provide a filter element having a continuously. increasing or deceasing void fraction (continuously decreasing or increasing tension) from the inside to the outside of the element. Such filter elements have particular merit for applications where insoluble particulates present in a gas stream cause plugging of the filter bed. Thus a filter element having a decreasing void fraction in the direction of gas flow would have a longer useful life, because of high particulate holding capacity, than a filter element having a uniform low void fraction. Alternatively, proper tension during winding can be used to provide an upstream higher packing density zone and a downstream lower packing density zone, with the upstream first fiber bed zone being at the core of the cylinder or at the outer circumference of the wound element, as desired.

Furthermore, point bonded nonwoven fabrics can be utilized so as to provide a mist eliminator element having a void fraction in the range of about 0.50 to 0.99 preferably 0.80 to 0.97. A typical fiber bed of this invention prepared from the 80/20 blend of polyester fibers described herein will have a void fraction of about 0.84 to about 0.96. The void fraction is a measure of the open volume in the mist eliminator and depends upon the value of the bed packing density and the fiber material density according to the relationship:

BED VOID FRACTION =

$$1 - \left[ \frac{\text{BED DENSITY}}{\text{FIBER MATERIAL DENSITY}} \right]$$

These densities can vary over a wide range depending upon the type of thermoplastic polymer used.

In a sense void fraction is not a total index for describing expected performance. Another index of collection performance and the anticipated pressure drop of an element, which is often used, is the "fiber specific surface area" expressed as square centimeters of the calculated fiber surface per unit volume of the mist eliminator element occupied by the bonded nonwoven fabric. Fiber specific surface area is therefore a function of fiber material density, fiber bed density and fiber diameter, and provides an indication of the number of sites for aerosol collection in a fiber bed. With point bonded fabrics the useful design range is 50 to 500 square centimeters per cubic centimeters of bed volume. For high efficiency elements of this invention the range will typically be about 300-400 and for high velocity (lower efficiency) elements less than about 200.

Figure 2:
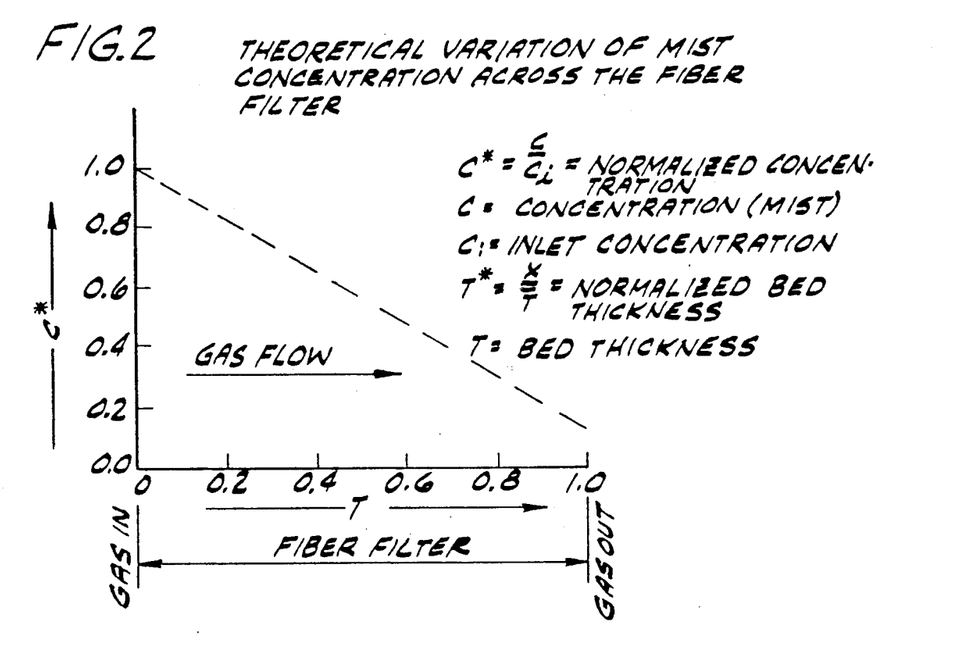
FIG. 2 is a plot showing the theoretical variation of mist concentration across a typical fiber bed filter element.
Figure 3:
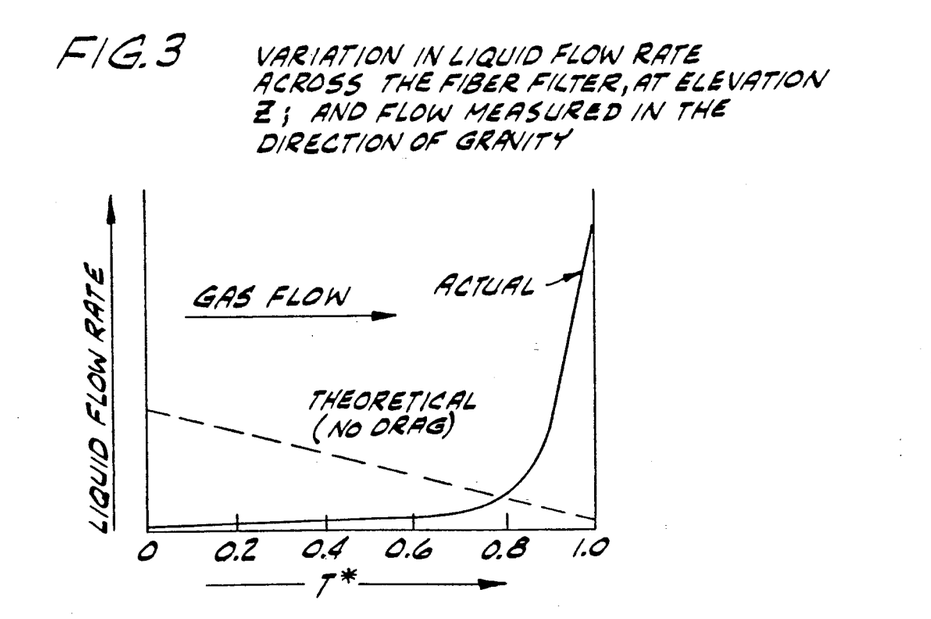
FIG. 3 is a plot of the theoretical and actual flow rate of collected liquid across a typical bulk packed fiber bed filter element at any elevation within the element, where the flow is measured in the direction of gravity.

As shown by FIG. 2 the mist concentration of the gas stream in a uniform fiber bed element is expected to decrease in the direction of gas flow across the fiber bed. If it is assumed that only gravity is controlling the movement of collected liquid within the fiber bed, then the liquid flow rate would also decrease in the direction of the gas flow across the fiber bed at any elevation in the bed. This theoretical distribution is shown in FIG. 3. However, in a typical high efficiency fiber bed element of the prior art the liquid movement has a much greater horizontal component than the theoretical, resulting mainly from gas drag forces, causing the liquid to be pushed to the downstream surface of the bed. It is only at that interface that liquid starts flowing downward, that is, in the direction expected due to gravitational forces. And, depending upon the magnitude of the gas velocity, reentrainment could occur at this interface. In FIG. 3 the actual liquid flow rate is also shown (liquid flow in the direction caused by gravitational forces) for a typical high efficiency fiber bed element of the prior art.

From the above it will be appreciated that the design of fiber bed elements is complex. For example, the non-uniform distribution of liquid across the bed causes a decreasing void fraction in the direction of gas flow which controls the wet bed pressure drop. Therefore, the wet bed pressure drop is an integral quantity resulting from a continuously changing void fraction. And this is of course a three dimensional problem.

Figure 4:
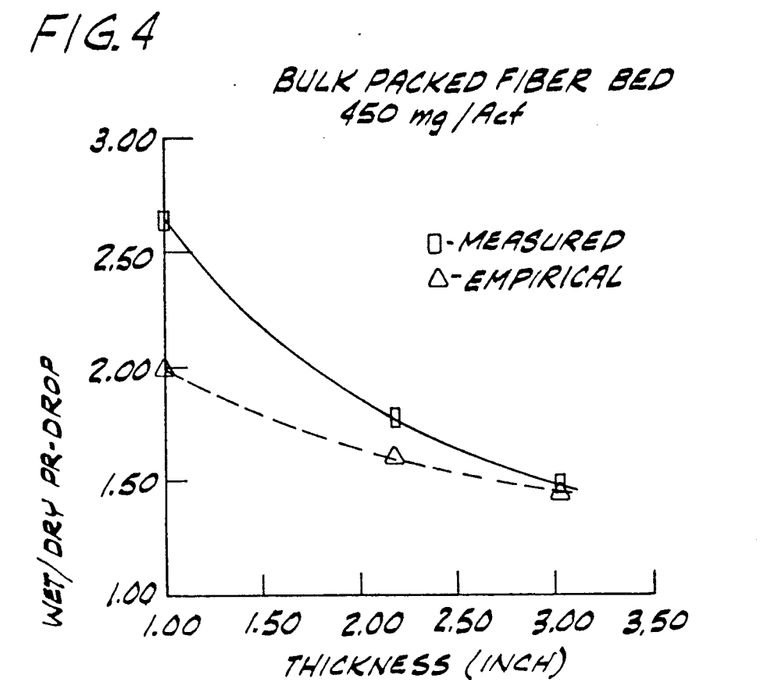
FIG. 4 is a plot of the variation in the ratio of the wet bed to the dry bed pressure drop versus fiber bed thickness for a bulk packed glass fiber bed.

Unfortunately there are no theoretical models to date that deal with this problem. Experimental data shows that the ratio of wet bed pressure drop to dry bed pressure drop typically increases in a non-linear fashion as the thickness of the filter bed decreases, keeping all other variables constant. FIG. 4 shows this effect for a typical bulk packed, glass fiber bed element of the prior art. Since such experimental or historical data is available it is used as a means of predicting the wet bed pressure drop of a given bulk packed fiber bed. However, those correlations are only useful with specific products for specific applications.

According to the present invention the undesirable effect of a changing wet bed void fraction in the direction of gas flow can be minimized, and in most cases substantially eliminated. Thus by using a filter bed element comprising a point bonded synthetic polymer nonwoven fabric it has been found that the ratio of the wet bed pressure drop to the dry bed pressure drop is essentially constant for beds of a wide range of fiber bed thicknesses. By essentially constant is meant that the difference in the ratio of the wet bed pressure drop to the dry bed pressure drop for a fiber bed having a thickness of about 2 inches (about 5 cm.) and a fiber bed having a thickness of about 3 inches (about 7.6 cm.) is not more than about 10-15%, usually less. The conditions to be used for determining such difference in pressure drop ratios for fiber bed of different thicknesses are a normalized velocity of 1 actual cubic foot per minute and a mist loading (water aerosol) of 450 mg./actual cubic foot of gas. Stated differently, it has been found that in typical commercial filter bed elements of this invention having bed thicknesses in the range of about 1-3 inches or more, the elimination of aerosols is essentially independent of the bed thickness, that is, the average incremental decrease in the dry bed void fraction is independent of the bed thickness and is primarily influenced by the nature of the aerosol.

Figure 5:
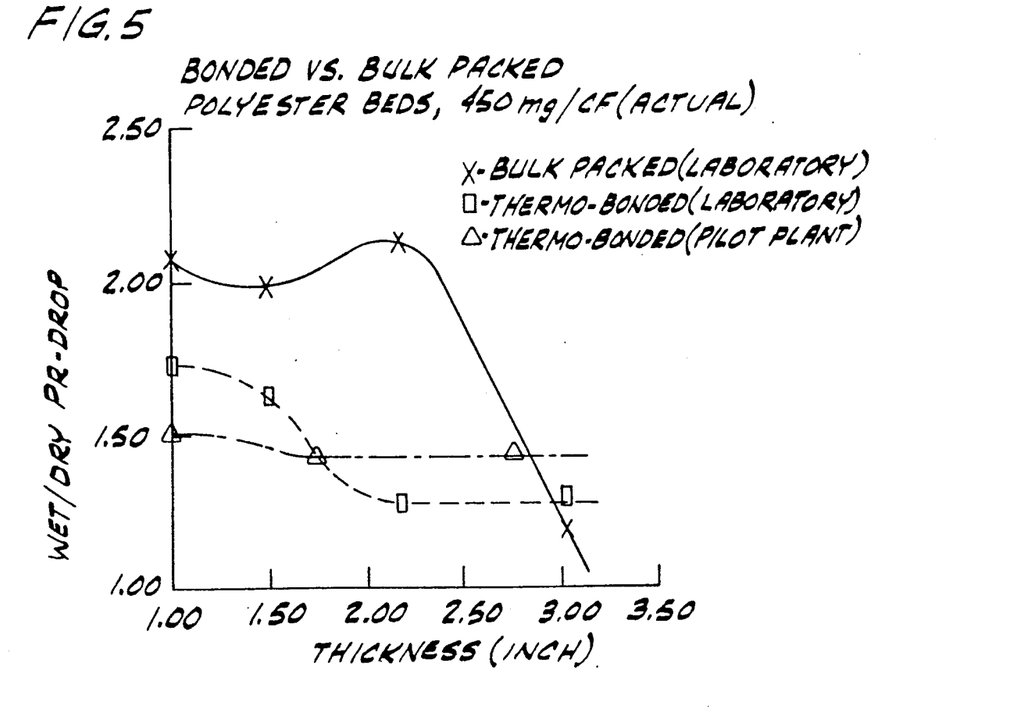
FIG. 5 is a plot of experimental data comparing the ratio of the wet bed to dry bed pressure drop, at varying bed thicknesses, for a filter element of the invention (laboratory and full scale) and for a bulk packed filter bed element of the prior art all comprised of the same polyester fiber. In the case of the bulk packed element, the bed was annealed after the bed was packed.

These effects are illustrated by FIG. 5 which is a plot of the ratio of the wet bed to dry bed pressure drops for different bed thicknesses (keeping all other variables constant) for a typical product of the invention and of the prior art (same polymer fiber). Thus FIG. 5 shows that even at very high mist loadings of 450 mg/ACF (actual cubic feet) (15.9 g/m$^3$) (and a normalized velocity of 1 actual foot per minute) the drainage characteristics of the point bonded synthetic polymer nonwoven fabric fiber beds (both in the laboratory and full scale models) are completely different than and more beneficial to filter collection performance than a typical bulk packed filter bed using the same synthetic polymer fiber (laboratory element). While FIG. 5 indicates that there is some non-linearity in the wet bed performance of the filter beds of the invention when the filter bed thickness is less than about 1.7 inches (laboratory element) it is to be noted that such performance is nevertheless superior to the performance of the bulk packed filter bed. The point bonded material used to generate the data used in FIG. 5 was made from polyester staple fiber and comprised a blend of 80% by weight of 1.35 denier by 1½ inch fiber and 20% by weight of 6 denier by 2 inch fiber. The material was point bonded on a calender roller at a pressure of 300 pounds per linear inch and a temperature of 230° C. The bonding pattern was essentially that shown in FIG. 1. The bulk packed bed utilized the same blend of fibers that was used to produce the nonwoven fabric.

Since the depth or thickness of the fiber bed (i.e. the dimension in the plane parallel to the gas flow) has little if any effect upon the practice of this invention, as is evident from FIG. 5, the bulk of the aerosol collected is usually separated within the first ½ inch or so of the fiber bed. However, beds of 1 to 3 inches thick or more, as are commonly used in the industry in order to meet very stringent emission or capacity requirements, are contemplated. Since the pressure drop ratio remains essentially constant in the fiber beds of this invention once a bed thickness of greater than about 1–1.2 inches (full scale element) is reached, as illustrated in FIG. 5, the calculation of the operating (wet bed) pressure drop for a given application need not be concerned with a changing ratio of wet bed pressure drop to dry bed pressure drop. Selection of bed thickness can therefore be based upon exit emission (collection efficiency) requirements or the pressure drop that can be tolerated. Thus, the bed depth or thickness is normally selected so as to provide the collection efficiency desired for the fiber diameter and bed voidage used and the particle size distribution of the aerosol, all of which is well within the capability of those skilled in the art.

Figure 6:
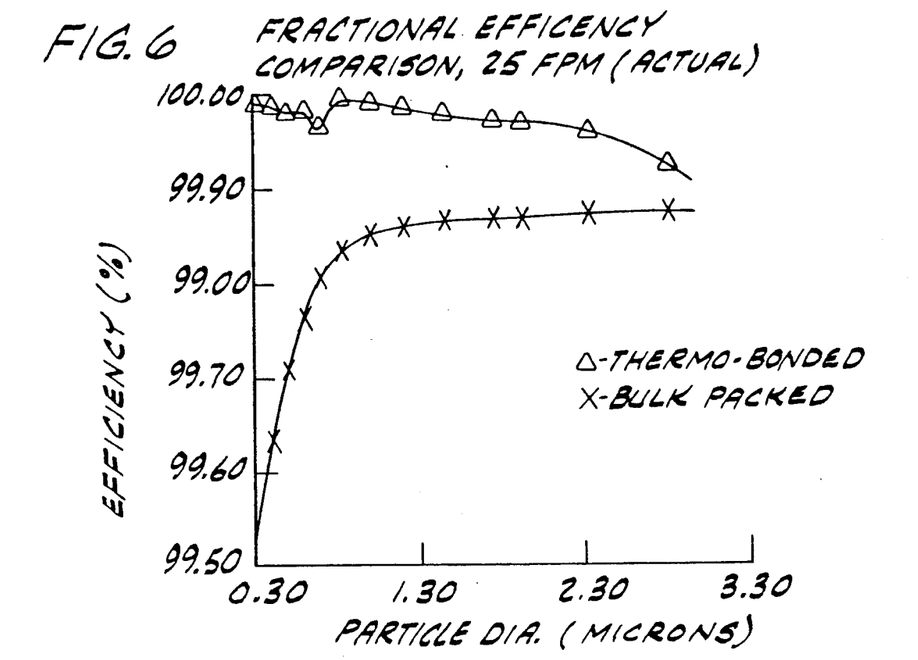
FIG. 6 is a plot of data obtained from full scale fiber bed elements comparing the fractional collection efficiency between a wound fiber bed filter element of the invention with a typical bulk packed heat treated fiber bed element of the prior art at comparable pressure drops.

Moreover, as illustrated by FIG. 6, the collection efficiency of the fiber bed elements of this invention is in agreement with the theoretical collection performance of an ideal fiber bed element in which the efficiency declines somewhat for particles in the size range of 0.3 to 0.6 microns. Therefore the selection of bed thickness in the practice of this invention can be made on the basis of the fractional collection efficiency requirement. On the other hand, since the collection performance of a bulk packed element on the small size particles (less than 1 micron) is continually decreasing with decreasing particle size, a combined effect of reentrainment and fiber matting, it is difficult to design a bulk packed element for such service.

Without limitation of the invention, it appears that in a filter bed element of this invention collected aerosol particles flow along the fibers to a bonding point where they combine to form a single larger size droplet, which can then flow more freely under the force of gravity and will not be as greatly influenced by drag and capillary forces as otherwise occurs in prior art filter beds. Therefore, the liquid flow rate distribution (in the direction of gravitational pull) within a fiber bed of the invention falls between the two extreme distributions shown in FIG. 3. Visual observations in laboratory scale experiments indicate distributions which are similar to the theoretical distribution shown in FIG. 3. These observations further substantiate the hypothesis of aerosol coalescence at bonding points and the formation of large size droplets which flow more freely under the force of gravity and are not greatly influenced by gas drag and other forces. A further benefit is that there is a decrease in reentrainment with the elements of this invention because of the absence of liquid buildup at the exit interface of the bed.

Furthermore, test data from the operation of commercial scale elements in a pilot plant substantiate the superior collection performance (efficiency) of filter bed elements of the invention compared to bulk packed filter bed elements of the prior art at comparable pressure drops. This comparison is also shown in FIG. 6.

In addition to the superior performance obtainable with the nonwoven fabric fiber bed elements of this invention other advantages also accrue. For example, due to the effect of point bonding of the fibers in a nonwoven fabric the stability of the fiber bed is increased; the bonding process increases the mechanical strength of the filter bed; and heat treatment of the finished element to relieve stress in the fibers is not required. Also, in the prior art bulk packed elements, because stable coalescence sites are not present, there is liquid buildup along the length of the fibers which increases the effective fiber diameter. An increase in the effective fiber diameter of the wet bed causes a decrease in efficiency.

The fiber bed elements and separators of this invention can be designed for either high efficiency or high bed velocity applications. High efficiency elements are normally used where environmental or process requirements require virtually complete removal of aerosol particles in the sub-micron to 3 micron size range. Collection of such aerosol particles at efficiencies up to 99.7% can be achieved in the elements of this invention at bed velocities up to about 30, preferably 25 feet per minute (9.1, preferably 7.6 meters per minute) with substantially no reentrainment.

In high efficiency separators fibers having a mean diameter in the range of about 1–30 microns will be employed in the fiber bed, preferably about 10–25 microns. The void fraction of such separators will usually be about 0.84 to about 0.96.

Higher bed velocity separators are most effective (normally 85 to 95% collection efficiency) when the aerosol characteristics are such that only the 1 to 3 micron and aerosol particulates are of concern and where collection by an impaction mechanism is suitable. In such cases, and particularly when large volumes of gas require treating, larger diameter fibers packed to bed voidages of from 85 to 97% provide adequate separation without high pressure drops. Such separators are typically designed to operate at bed velocities of from about 300 to 500 feet per minute (91 to 152.4 meters per minute). Since the upper limit of bed velocity used is often set by a consideration of reentrainment problems, the practice of the present invention will permit extension of the use of high velocity separators to even higher bed velocities, e.g., 700 to 800 feet per minute (213.4 to 243.8 meters per minute) or greater.

Generally, high velocity separators will use fibers of from about 25 to 75 microns mean diameter in the fiber bed. The fibers used are selected using the same criteria as described above for the high efficiency separators.

Fiber bed separators for use at bed velocities intermediate of the foregoing ranges for high efficiency and high velocity separators can be designed according to the teachings of this invention for appropriate applications to obtain any desired balance between collection efficiency and pressure drop.

Furthermore, a combination of two or more fiber beds, in the direction of gas flow, can be employed. In such an arrangement at least one bed is comprised of a mist eliminator element of this invention.

Fibers having a mean diameter of from about 5 to 20 microns are used in the first or upstream fiber bed of such high efficiency separators. Staple fibers of from about 7 to 12 microns mean diameter give excellent collection efficiency. The fibers used in the second or downstream fiber bed can be of the same staple length as those used in the first fiber bed, but preferably will be of larger mean diameter. Fibers of from about 15 to 75 microns mean diameter are preferred for the second fiber bed, and preferably from about 25 to 35 microns.

Suitable rigid, open network, supports such as mesh screens can be used to stabilize the fiber beds of the elements of this invention. Fiberglass reinforced polyesters are also excellent materials for support screens. This invention is not intended, however, to be limited in any way by the type of support means used since its only function is to hold the fiber beds without significantly interfering with gas flow.

In practice, neither the elements nor the gas flow need be totally vertical nor horizontal, respectively. In fact, gas flow in actual operation can vary substantially from the horizontal just so long as the general direction of gas flow is from the upstream surface of the element through to the downstream surface thereof (herein called "substantially horizontal"). It will also be obvious to those skilled in the art that the fiber bed elements need only be disposed substantially vertically without seriously affecting the practice of this invention.

Cylindrical fiber bed elements of the invention can be used in any application wherein cylindrical elements are normally used. They are, for example useful in separators where a high first fiber bed surface area is needed since they permit a high effective fiber bed surface in a minimum of vessel space. Flat fiber bed elements on the other hand, find particular application in high velocity fiber bed separators.

The installation of fiber bed elements in separating equipment is well-known in the art and the practice is no different with respect to elements of this invention. For example, cylindrical elements are normally constructed using rigid screens suitably affixed one to the other in rigid annular relationship with the fiber beds packed between the screens. One end of the element is closed against gas flow by a suitable plate and the other open end is mounted in a tube-sheet with suitable flanges. Normally, a plurality of elements are similarly mounted in the tube sheet. Depending on the desired direction of gas flow, the elements may be installed in the vessel either suspended from the tube sheet or they may extend upwardly from the tube sheet. Gas inlet means are provided to the vessel on the upstream of the tube sheet and gas outlet means are provided on the downstream side of the tube sheet. With various permutations, the gas may be caused to flow either from the outer circumference of each element inwardly to the core thereof, or from the core of the element outwardly to the outer circumference thereof.

Figure 8:
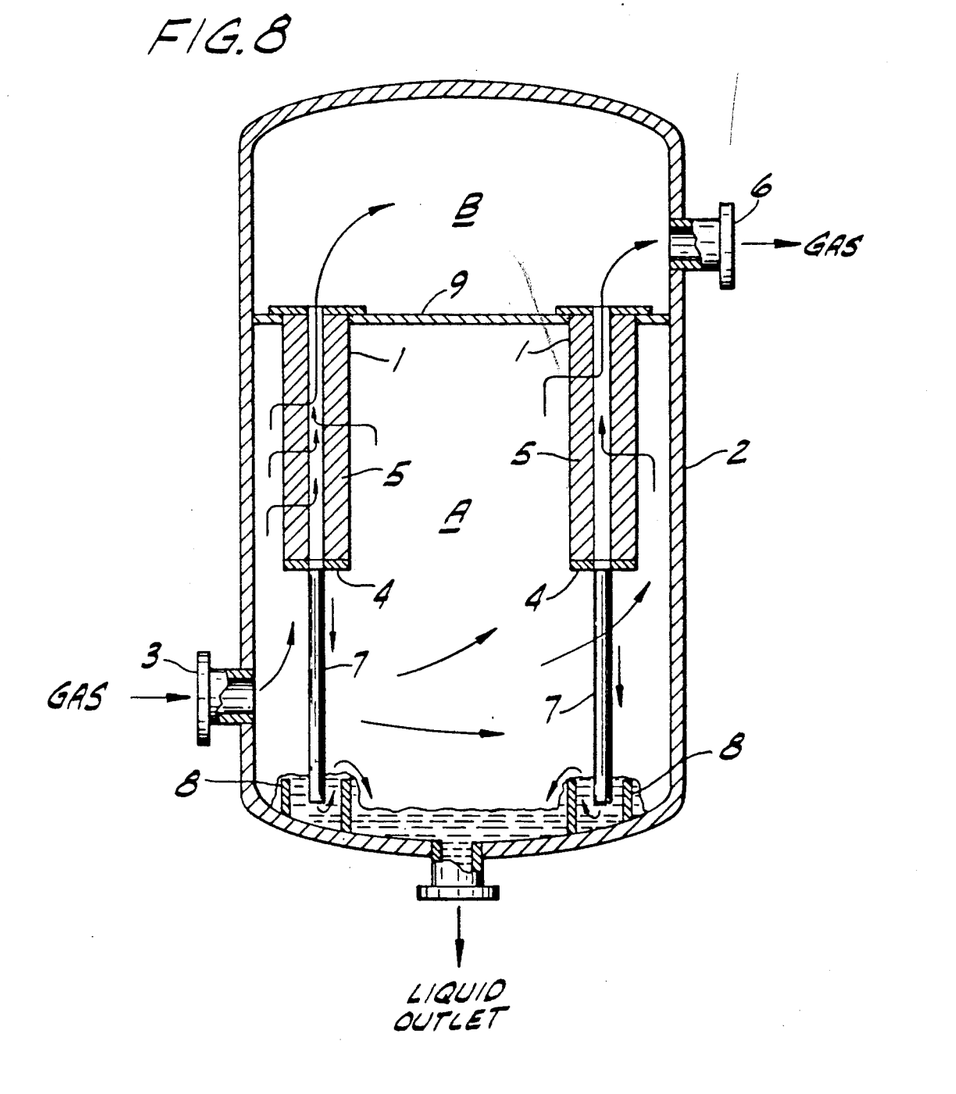
FIG. 8 is a cross-sectional view of one type of fiber bed separator containing an element of this invention which is a preferred embodiment of this invention.

One embodiment of cylindrical elements installed in a typical separator is shown in FIG. 8 wherein a fiber bed separator is shown consisting of a vessel 2 provided with gas inlet and outlet means, 3 and 6, respectively, and a plurality of cylindrical elements 1 suspended from tube sheet 9 with their open ends mounted in the tube sheet 9. The opposite end of each element is closed off against gas entering the core thereof from Zone A by plate 4 provided with a liquid drain pipe 7 extending to a suitable seal-pot 8 in the bottom of vessel 2.

In operation of the embodiment shown in FIG. 8, aerosol containing gas enters Zone A of vessel 2 through inlet 3. Since the lower end of each element 1 is sealed by plate 4, the gas cannot simply pass up the hollow cores of the elements but instead is forced to flow through the fiber bed 5 as shown by the arrows. The gas, now substantially free of aerosol and without reentrained liquid flows up to the hollow core of each element into Zone B of the vessel and out through outlet 6.

In each element, the aerosol is separated from the gas and drains down through the fiber bed 5 to bottom plate 4 and then down through drainpipe 7 to seal-pot 8.

The following examples illustrate the results obtained in application of the present invention to the separation of water mists or particles. For comparative purposes results are also included showing the separation performance of prior art bulk packed mist eliminator elements. The experimental set-up was as shown schematically in FIG. 7 where 1 is an ultrasonic mist generator made by Sunbeam Corporation, Model 661-S, 2 is a surge or catch tank for removal of large droplets of water, 3 is the fiber bed element undergoing testing, and 10 is a trap for removing excess water vapor condensate from the walls of the inlet line to the test element before the airborne water mist particles enter the test element, 4 is a liquid seal pot for removing the collected water mist particles from test element 3. The laminar flow element 5 (Mariam LFE Model 50MJ10, Type 9) is a calibrated device used to measure the air flow rate through the test element. Needle valve 6 is used to control the air flow generated by vacuum pump 7. Inclined manometers 8 and 9, which are filled with water, are used to measure the pressure drop across the test bed 3 and laminar flow element 5, respectively, and 12 is a calibrated collection vessel for measuring the test element drain rate. The mercury manometer 13 is used to indicate the static pressure at the upstream side of the laminar flow element 5.

Figure 1:
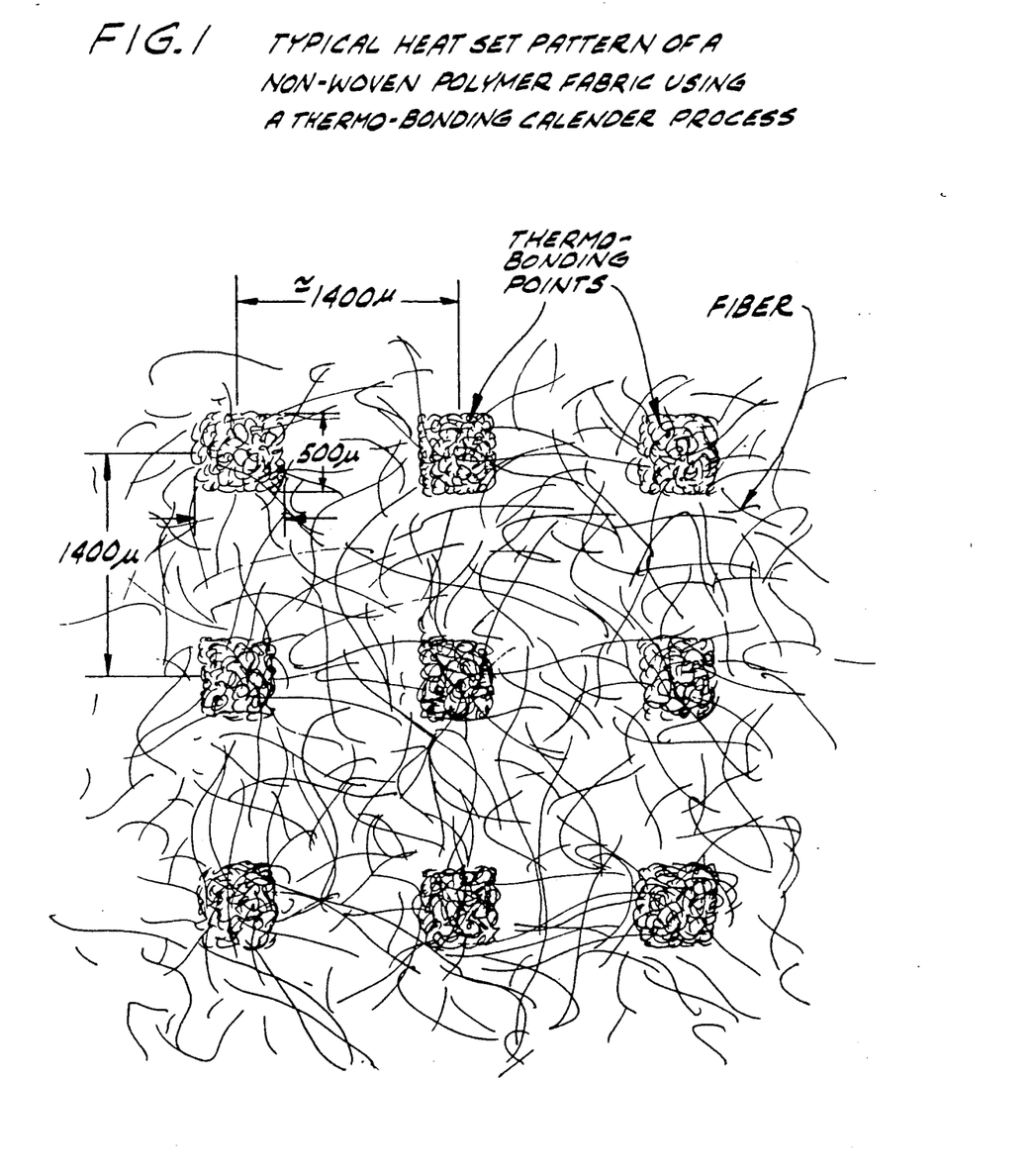
FIG. 1 is a representation of the heat set pattern of a typical point bonded synthetic polymer nonwoven fabric made by a thermo-bonding calendering process.

In the following examples the test beds were as follows: bed A was a bulk packed bed of untreated chemically resistant long staple glass fibers wherein the fibers had a nominal diameter of 7.6 microns; bed B was a blend of bulk packed polyester staple fibers, comprised of 20% by weight of 6 denier (25 microns diameter) by 2 inch fibers and 80% by weight of 1.35 denier (10 microns diameter) by 1½-inch fibers, which were initially heat treated at about 300°–330° F. for about 1 hour prior to packing in order to induce shrinkage and given a second heat treatment within the same temperature/time range after the bed was packed; and bed C was comprised of a thermo-bonded nonwoven polyester fabric made from a polyester staple fiber blend having the same proportions of the same fibers as used for bed B wherein the bonding pattern conformed substantially to that shown in FIG. 1. Bonding was at a temperature of about 230° C. (446° F.).

The cylindrical laboratory size test element, 3, comprises a glass tube of 2-1/16 inch inside diameter (52.4 mm) having flanges on both ends. The flange to flange thickness can be changed from 1 inch (25.4 mm) up to 3 inches (76.2 mm) to generate the needed experimental data. Two screen plates having 92, ⅛-inch diameter holes (3.18 mm) are used on the ends to hold the test fiber material within the cylindrical glass tube. The flanges on the glass tubes are designed to fit within standard "RAYCO" (a glass filter holder) rubber/teflon sleeves, so that the entire test element with gas inlet and gas outlet having an excess condensate drain at the inlet and the test element drain at the outlet can be assembled easily in the laboratory. After assembly, a test element is checked for leaks by pressurizing it and then placing it in a water bath to determine if air bubbles are present. The volume of every test element is measured by filling it with a known water volume, e.g., from a burette. The weight of the test fiber required in the test element to maintain approximately the same dry bed pressure drop is then determined by trial and error. The test element density is then calculated and is expressed in weight of test fiber per unit volume of the test element.

Preparation of a bulk packed glass fiber bed element involves first determining the amount of fiber required by weighing the glass fibers on an electronic balance. The gas inlet assembly is then coupled with one end of the glass tube test cell holder using appropriate rubber/teflon gaskets and also the screen plate on one end of the cell is secured. The test element cell is then hand packed with the glass fiber. After packing, the screen plate on the other end of the cell is secured, the gas outlet assembly is attached and the clamps hand tightened.

The preparation of a bulk packed polyester bed element is little different than for a glass fiber bed element. First the weight of polyester fiber required is calculated and then the required amount determined using an electronic balance. The polyester fiber is then hand packed into the test element having one screen plate in place. The other screen plate (92×⅛" holes) is then attached and this assembly is then placed in a 4" C-clamp. Pressure is applied on the ends by tightening the C-clamp. The whole assembly is then heat treated in an electric oven at 330° F. ±10° F. for 1 hour to relieve all the mechanical stresses in the fiber. Thereafter the test cell is allowed to cool at room temperature. The bulk packed polyester fiber bed element is then assembled as before.

To prepare a test element for laboratory experiments using point bonded nonwoven material circular discs of the nonwoven material are first prepared using a heavy duty stamping tool. These pre-cut discs are then weighed using an electronic balance to determine the amount needed, i.e., the amount needed to satisfy the fiber bed density requirement. The discs are then packed into the test cell cup and the end plates secured as explained above. Therefore, in the laboratory apparatus the arrangement of the point bonded nonwoven material is in the form of individual fabric layers as compared to a gathered fabric (roving) used in the full scale wound element (as described herein) used in the pilot plant experiments. However, as the test results show, (see FIG. 5) the general wet bed characteristics of the laboratory and full scale elements are comparable.

Figure 7:
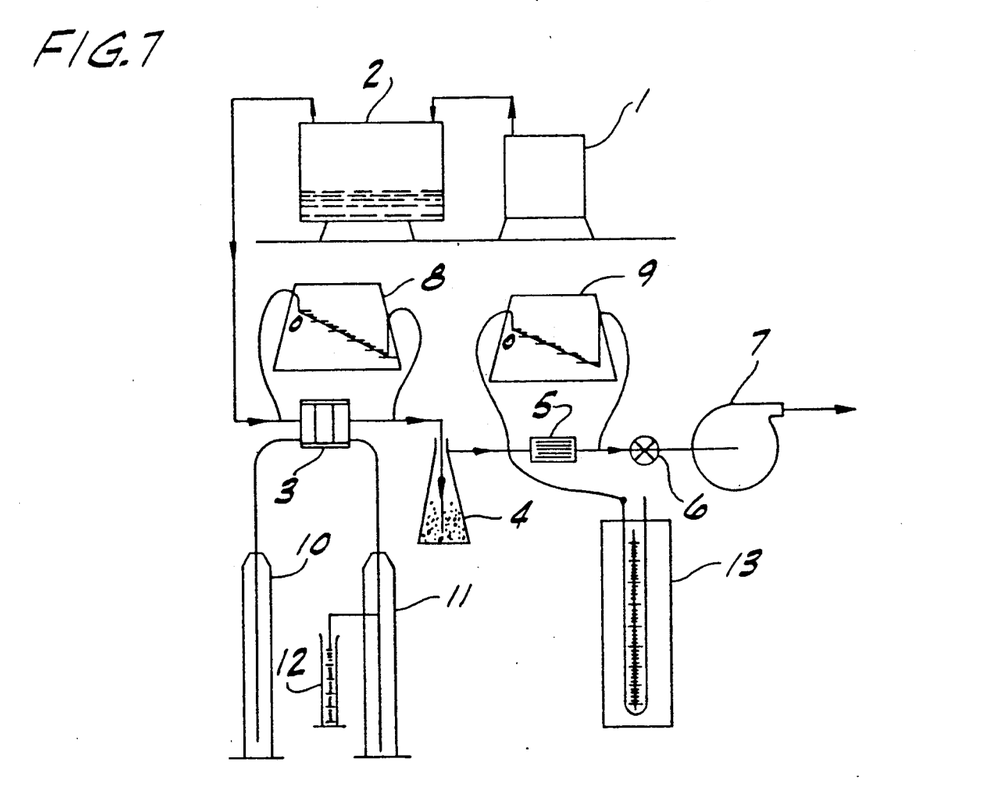
FIG. 7 is a schematic drawing of the laboratory setup used in generating various data presented herein as well as in the development of the plots in FIGS. 4 and 5.

For determination of the data presented in Table A the procedure, with reference to FIG. 7, was as follows.

The test bed element, 3, is first supported on a stand. Gas inlet and gas outlet glass tubes are then connected. All glass tube connections are through standard ½-inch ground glass ball and socket using a number 28 clamp for securing the connections. Vacuum grease is used to insure a leak proof joint. Glass tubes for the excess wall condensate collector, 10, on the upstream, and drain rate measure 12, on the downstream, are then secured. The gas line from the surge tank, 2, is not connected. Keeping the main valve 6 closed, vacuum pump 7 is started. Valve 6 is then opened, to allow room air to flow through the test element, 3. Before recording any test data element 3 is subjected to at least three pressure cycles. A pressure cycle consists of varying the air velocity from 0 to a maximum of 60 feet per minute and then dropping the velocity to zero. This is achieved by opening and closing the main valve 6. This operation allows the test fiber bed to relax and reach equilibrium.

The dry bed pressure drop is then determined at two velocity settings that correspond to a pressure drop of 1 and 1.5 inches of water column across the laminar flow element as measured by manometer 9. A typical data set consists of recording the experimental number, test bed identification, fiber and bed identification, the room air temperature, barometer, date, time, pressure drop across laminar flow element, static pressure in inches of mercury on the upstream of the laminar flow element, pressure drop across the test bed, and a pressure drop correction to account for the two screens supporting the test element. Typically, the measurements are repeated to check the reproducibility of the data.

After determining the dry bed pressure drop, the gas inlet tube to test element 3 is connected to the surge tank, 2, and the ultrasonic mist generator, 1, is started at full capacity. The saturated gas stream flow is adjusted so that the pressure drop across the LFE, 5, is maintained at 1.5 inches of water column. The pressure drop across the test element rises continuously typically for 30–45 minutes before reaching a relatively steady state. The test set-up is operated typically for 10–30 hours to ensure a steady state reading on the test element drain rate (measured in milligrams per minute), as measured in vessel 12, and the pressure drop across the test element as measured by manometer.

From the raw test data the actual flow rate and the actual gas velocity flowing through the test element are then determined. The final results are expressed in terms of the pressure drop in inches of water column at a gas velocity of 1 actual foot per minute.

The results of such tests, using bed A, are presented in Table A. A plot of the data is shown in FIG. 4. The water mist used was at room temperature and had a particle mass median diameter of 2 micrometers. The equivalent surface area diameter was calculated using the equation given above. The fiber diameter, d, was 8 microns and the number of crossover points was assumed to be 5. The ratio of the equivalent surface area diameter to the fiber diameter was, on that basis, 2.2. The fiber specific surface area of the bed was 413 $cm.^2/cm.^3$.

TABLE A

| Exp. No. | Bed thick. inches[1] | Mist load of 450 mg/ACF[2] Pres. Drop. IWC[3] | | Ratio Wet-Dry |
|---|---|---|---|---|
| | | Dry | Wet | |
| 1 | 1.00 | 0.166 | 0.438 | 2.639 |
| 2 | 2.19 | 0.284 | 0.504 | 1.775 |

TABLE A-continued

| | Mist load of 450 mg/ACF[2] | | | |
|---|---|---|---|---|
| Exp. No. | Bed thick. inches[1] | Pres. Drop, IWC[3] Dry | Wet | Ratio Wet-Dry |
| 3 | 3.03 | 0.437 | 0.646 | 1.478 |

[1]Bed density of 13.14 lbs./ft$^3$
[2]ACF = actual cubic feet of gas
[3]IWC = inches of water column For the data in Table B, Experiments 4–11, the procedure followed was the same as used for generating the data presented in Table A. The bed density for Experiments 4–11 was selected so as to provide substantially the same dry bed pressure drop at a bed thickness of 3 inches. The mean fiber diameter for a fiber blend is determined from the equation:

$$\frac{1}{d_m} = \frac{f_1}{d_1} + \frac{f_2}{d_2} + \frac{f_3}{d_3} = \frac{f_x}{d_x}$$

where $d_m$ = mean fiber diameter of the fibers in the blend
$f_x$ = weight fraction of component x in a blend having a fiber diameter of $d_x$.

The mean fiber diameter of the fiber blend determined by using the above equation was 13 microns. The calculated equivalent surface area diameter for the bulk packed fiber bed used in Experiments 4–7 was 29 (assumed n=5). The equivalent surface area diameter for the point bonded fabric used in Experiments 8–14 was 387. The fiber specific surface area of the element for Experiments 4–7 was 429 cm.$^2$/cm.$^3$ and for Experiments 8–14 was 373 cm.$^2$/cm.$^3$. The data for Experiments 12–14 was obtained in a pilot plant wherein the test element was a full scale mist eliminator element (24" OD by 72" high). The configuration of equipment and procedures used in the pilot plant closely followed those employed in the laboratory.

TABLE B

| | | Mist load of 450 mg/ACF[3] | | | |
|---|---|---|---|---|---|
| Exp. No. | Bed | Bed thick. inches | Pressure Drop, IWC[4] Dry | Wet | Ratio Wet-Dry |
| 4 | B[1] | 1.00 | 0.114 | 0.237 | 2.079 |
| 5 | B | 1.50 | 0.169 | 0.335 | 1.982 |
| 6 | B | 2.19 | 0.266 | 0.568 | 2.135 |
| 7 | B | 3.03 | 0.418 | 0.494 | 1.182 |
| 8 | C[2] | 1.00 | 0.110 | 0.190 | 1.727 |
| 9 | C | 1.50 | 0.229 | 0.372 | 1.624 |
| 10 | C | 2.19 | 0.323 | 0.411 | 1.272 |
| 11 | C | 3.03 | 0.443 | 0.571 | 1.289 |
| 12 | C[2] | 1.00 | 0.143 | 0.216 | 1.510 |
| 13 | C | 1.75 | 0.233 | 0.333 | 1.429 |
| 14 | C | 2.76 | 0.408 | 0.588 | 1.441 |

[1]Bed density of 12.00 lbs/ft$^3$
[2]Bed density of 10.44 lbs/ft$^3$
[3]ACF = actual cubic feet of gas
[4]IWC = inches of water column The fractional collection efficiency comparison plot shown in FIG. 6 was prepared using the data from Table C, below. The data was obtained in the pilot plant using full scale mist eliminator elements. The fiber was the same 80/20 blend of polyester fibers used in the previous experiments. A sodium sulphate solution of about 10% concentration was air atomized to generate the test aerosol for fractional efficiency measurements. Conventional sampling techniques, i.e. Anderson impactor sampling, was employed to determine the fractional collection efficiency.

TABLE C

FRACTIONAL EFFICIENCY COMPARISON
@ 25 FPM (actual)
MIST LOADING = 120 MG/CF (actual)

| Particle Size - Microns | Bulk[1] Bed Density 12.00 lbs/CF Efficiency % | Bonded[2] Bed Density 10.44 lbs/CF Efficiency % |
|---|---|---|
| 0.314 | 99.487 | 99.992 |
| 0.505 | 99.709 | 99.982 |
| 0.610 | 99.765 | 99.984 |
| 0.838 | 99.834 | 99.995 |
| 1.207 | 99.860 | 99.986 |
| 1.756 | 99.869 | 99.972 |
| 1.929 | 99.870 | 99.968 |
| 2.332 | 99.873 | 99.960 |
| 2.820 | 99.875 | 99.926 |

[1]Bulk packed element bed - wet bed pressure drop of 11.5 inches of water column.
[2]Thermo-bonded nonwoven fabric-wound element - wet bed pressure drop of 12.5 inches of water column. Wound as a simulated roving of about 4 folds per foot of an 80 inch wide fabric.

This invention is not limited to the form in which the fabric is installed in the fiber bed. For example, in addition to the use of a long continuous fiber roving spirally wound around a cylindrical foraminous core a single length of fabric may be folded and compressed to the desired packing density or a plurality of sheets of fabric may be layered to form a fiber bed.

This invention is equally applicable to the separation of soluble solid aerosols from gases where a liquid (e.g., water in the case of water soluble solids) is used either to irrigate a first fiber bed or is injected into the gas stream as a fog or mist prior to a first fiber bed. In such instances, the liquid collected is a solution of the solids in the solute chosen.

The foregoing description of the several embodiments of this invention is not intended as limiting of the invention. As will be apparent to those skilled in the art the inventive concept set forth herein can find many applications in the art of fiber bed separations and many variations on and modifications to the embodiments described above may be made without departure from the spirit and scope of this invention.

What is claimed is:

1. A fiber bed mist eliminator element comprising a synthetic polymer nonwoven fabric fiber bed containing stable point bonded coalescing sites distributed throughout the fiber bed, the sites having an equivalent surface area diameter of at least about 3 times the average means diameter of the fibers in the fabric, said equivalent surface area diameter and said mean diameter being expressed in the same units, wherein the ratio of the wet bed pressure drop to the dry bed pressure drop of said bed is essentially constant, and wherein said equivalent surface area diameter is expressed by the equation $$\sqrt{\frac{A_s}{3.14}}$$

where
$A_s$ is the average surface area of a bonding site,
wherein
$A_s = $ $$\left(\frac{d_2}{2} + dt\right)3.14, \text{ where}$$

d = the average diameter of the horizontal surface of the coalescing site, and t = the average thickness of depth of the coalescing sites.

2. A fiber bed mist eliminator element of claim 1 wherein the coalescing sites have an average equivalent surface area diameter of at least about 10 times the average mean diameter of the fibers in said fabric.

3. A fiber bed mist eliminator element of claim 2 where the mean diameter of the fibers is in the range of about 10 to about 35 microns.

4. A fiber bed mist eliminator element of claim 2 where the fiber bed of the element further comprises a non-synthetic fiber.

5. A fiber bed mist eliminator element of claim 2 where the coalescing sites have a thickness in the range of about 35% to about 95% of the fabric thickness.

6. A fiber bed mist eliminator element of claim 5 where the point bonding is in a substantially uniform pattern.

7. A fiber bed mist eliminator element of claim 6 where the point bonding is thermal point bonding.

8. A fiber bed mist eliminator element of claim 7 where the thermal point bonding is conducted in a calendering operation.

9. A fiber bed mist eliminator element of claim 6 where the distance between the centers of the bonding points is approximately 1400 microns.

10. A fiber bed mist eliminator element of claim 2 where the mean diameter of the fibers is in the range of about 5-50 microns.

11. A fiber bed mist eliminator element of claim 10 where the fibers comprise a blend of at least two fibers having different average mean fiber diameters.

12. A fiber bed mist eliminator element of claim 11 where the blend is comprised of two fibers wherein the ratio of the average means fiber diameter of the two fibers is about 2 to 1.

13. A fiber bed mist eliminator element of claim 11 where the synthetic polymer nonwoven fabric is a polyester nonwoven fabric.

14. A fiber bed mist eliminator element of claim 11 where the average means fiber diameter of a first fiber is about 10 microns and the average mean fiber diameter of a second fiber is about 25 microns.

15. A fiber bed mist eliminator element of claim 14 where the average fiber length of the first fiber is about 4 cm. and the average fiber length of the second fiber is about 5 cm.

16. A fiber bed mist eliminator element of claim 2 where the tenacity ratio of the synthetic polymer nonwoven fabric is less than about 25.

17. A fiber bed mist eliminator element of claim 16 where the tenacity ratio is less than about 10.

18. An element of claim 2 where the fabric is a lightly point bonded nonwoven fabric.

19. A fiber bed mist eliminator element of claim 18 where the nonwoven fabric has a weight of less than about 1 oz./yd.$^2$.

20. A fiber bed mist eliminator element of claim 19 where the weight si about 0.7 oz./yd.$^2$.

21. A fiber bed mist eliminator element of claim 2 where the nonwoven fabric is in the form of a simulated roving.

22. An element of claim 21 where the fabric is a polyester fabric.

23. A fiber bed mist eliminator element of claim 21 where the fabric is comprised of fibers having an average mean diameter of from about 5 to about 30 microns and the element has a bed void fraction of about 0.84 to about 0.96.

24. A fiber bed mist eliminator element of claim 21 where the roving is comprised of essentially flat folds of fabric.

25. A fiber bed mist eliminator element of claim 24 where the fabric is comprised of fibers having an average mean diameter of from about 5 to about 50 microns and the fabric is packed to a void fraction in the range of about 0.80 to about 0.97.

26. A fiber bed mist eliminator element of claim 24 where the number of folds is about 2 to about 6 per foot of fabric width.

27. A fiber bed mist eliminator element of claim 24 where the roving is wound around a foraminous core.

28. A fiber bed mist eliminator element of claim 27 where the void fraction of the element is in the range of about 0.80 to about 0.97.

29. A fiber bed mist eliminator element of claim 27 wherein, during the winding of said roving around said core, the tension is varied so as to provide a bed having a decreasing void fraction in the direction of gas flow.

30. A fiber bed mist eliminator element comprising a synthetic polymer nonwoven fabric fiber bed having a void fraction in the range of about 0.50 to about 0.99 and containing stable coalescing sites formed by point bonding distributed throughout the fiber bed, wherein the sites have an equivalent surface area diameter of at least about 10 times the average mean diameter of the fibers in the fabric, said equivalent surface area diameter and said mean diameter being expressed in the same units, and the fiber bed is comprised of a blend of a first fiber having an average mean fiber diameter of about 10 microns and a second fiber having an average mean fiber diameter of about 25 microns, and wherein said equivalent surface area diameter is expressed by the equation $$\sqrt{\frac{A_s}{3.14}}$$

where $A_s$ is the average surface area of a bonding site, wherein $$A_s = \left(\frac{d^2}{2} + dt\right)3.14, \text{ where}$$

d = the average diameter of the horizontal surface of the coalescing site, and t = the average thickness of depth of the coalescing sites.

31. A separator for removal of aerosols from a moving gas stream as a liquid phase, comprising inlet means for an aerosol-containing gas, at least one element comprised of a synthetic polymer nonwoven fabric fiber bed containing point bonded coalescing sites distributed throughout said fiber bed, said sites having an equivalent surface area diameter of at least about 3 times the average mean diameter of the fibers in said fabric, said equivalent surface area diameter and said mean diameter being expressed in the same units, wherein the ratio of the wet bed pressure drop to the dry bed pressure drop is essentially constant, outlet means for the gas stream and outlet means for the liquid phase, and wherein said equivalent surface area diameter is expressed by the equation $$\sqrt{\frac{A_s}{3.14}}$$

wherein $A_s$ is the average surface area of a bonding site, where $$A_s = \left(\frac{d^2}{2} + dt\right)3.14, \text{ where}$$

d = the average diameter of the horizontal surface of the coalescing site, and t = the average thickness of depth of the coalescing sites.

32. A separator of claim 31 where the nonwoven fabric is obtained from a blend of at least two fibers having different means fiber diameters.

33. A separator of claim 32 where the blend is comprised of two fibers wherein the mean fiber diameter of the fibers is in the range of about 5-50 microns.

34. A fiber bed separator of claim 33 where the fibers are polyester fibers having a mean fiber diameter in the range of about 10-35 microns.

35. A fiber bed mist eliminator element comprising a synthetic polymer nonwoven fabric fiber bed having a void fraction in the range of about 0.80 to about 0.97 and containing stable point bonded coalescing sites distributed throughout the fiber bed, wherein the sites have an equivalent surface area diameter of at least about 10 times the average mean diameter of the fibers in the fabric, said equivalent surface area diameter and said mean diameter being expressed in the same units, the fiber bed is comprised of a blend of fibers having an average mean diameter of from about 25 to about 75 microns and the nonwoven fabric is in the form of a simulated roving, and wherein said equivalent surface area diameter is expressed by the equation.

$$\sqrt{\frac{A_s}{3.14}}$$

where $A_s$ is the average surface area of a bonding site, wherein $$A_s = \left(\frac{d^2}{2} + dt\right)3.14, \text{ where}$$

d = the average diameter of the horizontal surface of the coalescing site, and t = the average thickness of depth of the coalescing sites.

36. An element of any one of claims and 2-4, 6-13, 15, 16, 24-33, 35, 36, 39, 40 and 43 where the fiber bed has a thickness of about 1 to about 3 inches.

37. In a process for removing aerosols from a moving gas stream in a separator wherein an aerosol-containing gas is caused to flow through a substantially vertically mounted fiber bed element resulting in separation of a substantial portion of the aerosol from the gas as a liquid phase, the improvement comprising providing an element comprised of a synthetic polymer nonwoven fabric fiber bed containing point bonded coalescing sites distributed throughout said fiber bed, said sites having an equivalent surface area diameter of at least about 3 times the average mean diameter of the fibers in said fabric, said equivalent surface area diameter and said mean diameter being expressed in the same units, wherein the ratio of the wet bed pressure drop to the dry bed pressure drop is essentially constant, and wherein said equivalent surface area diameter is expressed by the equation $$\sqrt{\frac{A_s}{3.14}}$$

where $A_s$ is the average surface area of a bonding site, wherein $$A_s = \left(\frac{d^2}{2} + dt\right)3.14, \text{ where}$$

d = the average diameter of the horizontal surface of the coalescing site, and t = the average thickness of depth of the coalescing sites.

* * * * *